United States Patent [19]
Xie

[11] Patent Number: 5,588,053
[45] Date of Patent: Dec. 24, 1996

[54] DTMF DETECTOR SYSTEM AND METHOD WHICH PERFORMS STATIC AND DYNAMIC THRESHOLDING

[75] Inventor: Zheng-yi Xie, Austin, Tex.

[73] Assignee: Advanced Micro Devices, Sunnyvale, Calif.

[21] Appl. No.: 585,530

[22] Filed: Jan. 11, 1996

Related U.S. Application Data

[63] Continuation of Ser. No. 563,973, Nov. 29, 1995.

[51] Int. Cl.$^6$ ................................................ H04M 1/50
[52] U.S. Cl. .......................... 379/386; 379/282; 379/283
[58] Field of Search ................................. 379/386, 282, 379/283

[56] References Cited

U.S. PATENT DOCUMENTS

| | | | |
|---|---|---|---|
| 4,853,958 | 8/1989 | Rabipour et al. | 379/386 |
| 5,257,309 | 10/1993 | Brandman et al. | 379/386 |
| 5,319,703 | 6/1994 | Drory | 379/351 |
| 5,325,427 | 6/1994 | Dighe | 379/386 |
| 5,353,345 | 10/1994 | Galand | 379/386 |
| 5,408,529 | 4/1995 | Greaves | 379/386 |
| 5,426,696 | 6/1995 | Zimbrek | 379/386 |
| 5,428,680 | 6/1995 | Murata et al. | 379/386 |
| 5,495,526 | 2/1996 | Cesaro et al. | 379/386 |

OTHER PUBLICATIONS

*Digital Signal Processing Applications Using the ADSP-2100 Family*, vol. 1, by The Applications Engineering Staff of Analog Devices, DSP Division, Edited by Amy Mar, 1992 by Analog Devices, Inc., pp. 441–500.

Primary Examiner—Krista M. Zele
Assistant Examiner—Gloria Tebcherani
Attorney, Agent, or Firm—Conley, Rose & Tayon, P.C.; Jeffrey C. Hood

[57] ABSTRACT

An improved dual tone multifrequency (DTMF) or multi-tone signal detector which uses both static and dynamic thresholding techniques to provide an increased functional dynamic range, improved speech immunity for improved detection and reduced error, and simplified signal to noise ratio control. The DTMF detector receives signals from the transmission media, calculates energy values for the different frequencies, and then determines maximum values of the energy values for each of the frequency groups, referred to as M(1) and M(2). The DTMF detector then performs both static and dynamic thresholding according to the present invention to ensure valid tone detection. The static thresholding compares each of the M(1) and M(2) values with a static threshold value to ensure that the maximum energy values have a minimum energy to warrant detection. Since both static and dynamic thresholding are performed according to the present invention, the static threshold value is preferably set low, thus allowing an increased functional dynamic range. The dynamic thresholding computes the ratio of the maximum value in each sub-array to each of the other values in the respective sub-array, wherein the remaining values in the sub-array are presumed to be noise. This ratio essentially computes the signal to noise ratio (SNR) of the received signals. These ratios are then compared with a second threshold. If the maximum energies are not greater than the static threshold, or any of the ratios is not greater than the second threshold value, then a SNR error is set, and no detection is indicated. The present invention improves the DTMF detector's functional dynamic range and noise immunity.

28 Claims, 10 Drawing Sheets

TOP LEVEL FLOW CHART

TOP LEVEL FLOW CHART $N(1)=172$; $N(2)=177$; $N(3)=178$; $N(4)=178$; $N(5)=172$ $N(6)=168$; $N(7)=168$; $N(8)=176$; $N(m)=N(m-8)$, for $m=9,..,16$

GOERTZEL DFT USING DIFFERENT FRAME
LENGTHS & GAIN ADJUSTMENT

NOTE:

FEEDFORWARD ONLY COMPUTED
WHEN n=N FOR FINAL RESULT $-W_N^K = -\exp(-J * 2\ Pi * k/N)$ $A(k) = amp\ X(k)$

GOERTZEL ALGORITHM

FIND MAX GAIN IN EACH
GROUP & OBTAIN ITS INDEX

Ts: STATIC THRESHOLD

STATIC THRESHOLDING

DYNAMIC THRESHOLDING

SECOND HARMONIC CHECK FOR
ELIMINATING SPEECH TRIGGER DETECTIONS

GUARD_TIME CHECK

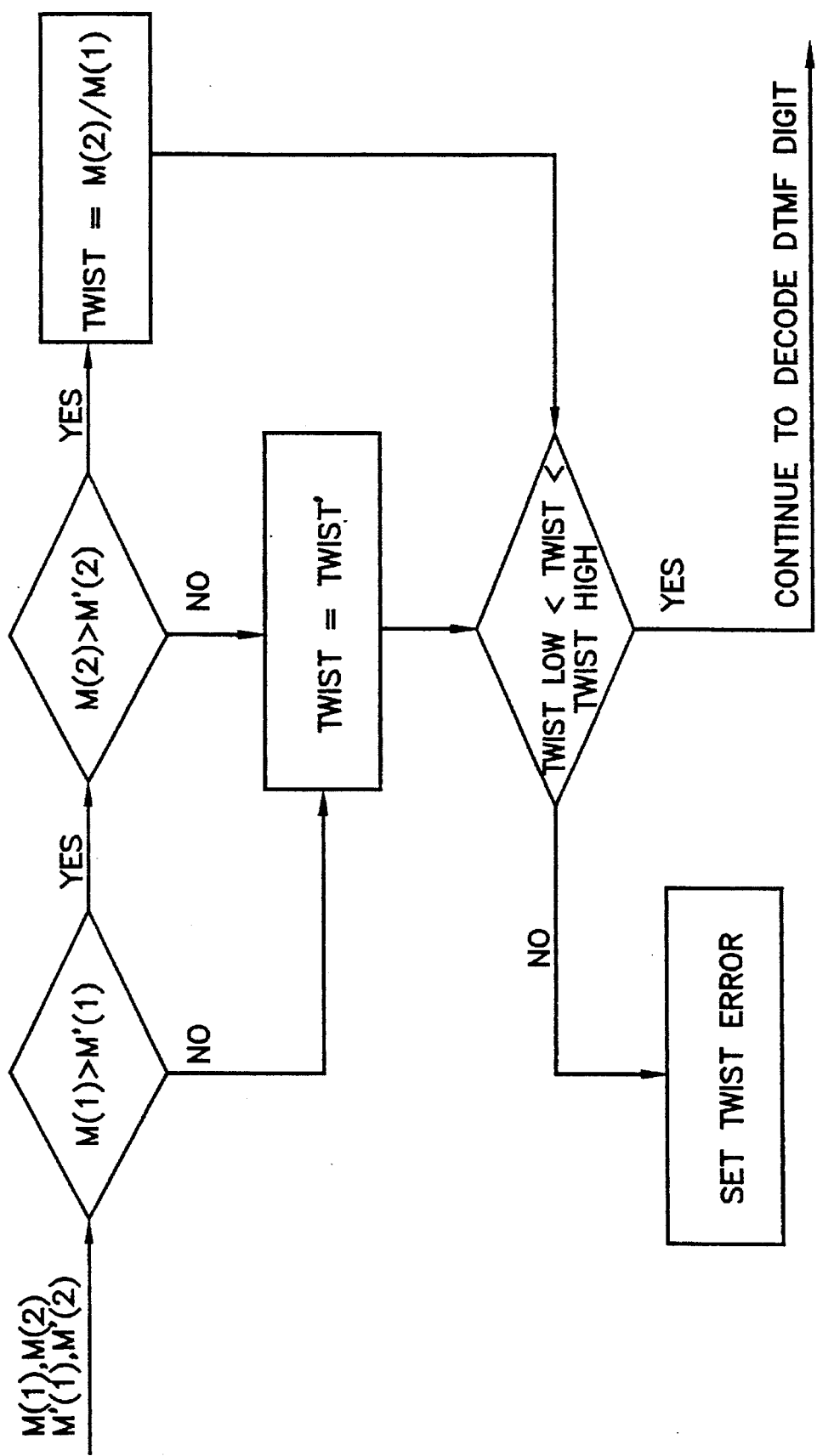
FIG. 10: TWIST CHECK
TWIST': TWIST VALUE IN PREVIOUS FRAME ations, and more particularly to a DTMF detector which performs static thresholding using signal level comparisons against a fixed threshold and dynamic thresholding using signal to noise ratio comparisons for improved functional dynamic range and better speech/noise immunity.

DTMF DETECTOR SYSTEM AND METHOD WHICH PERFORMS STATIC AND DYNAMIC THRESHOLDING

CONTINUATION DATA

This is a continuation of co-pending application Ser. No. 08/563,973 titled System and Method for Dual Tone Multifrequency Detection Using Variable Frame Widths, and filed Nov. 29, 1995.

FIELD OF THE INVENTION

The present invention relates to the detection of dual tone multifrequency coded signals, and more particularly to a DTMF detector which performs static thresholding using signal level comparisons against a fixed threshold and dynamic thresholding using signal to noise ratio comparisons for improved functional dynamic range and better speech/noise immunity.

DESCRIPTION OF THE RELATED ART

Dual tone multifrequency (DTMF) coding is a generic name for push-button telephone signaling which is used in Noah American telephone systems. A DTMF signal is used for transmitting a phone number or the like from a push button telephone to a telephone central office. DTMF signaling is quickly replacing dial pulse signaling in telephone networks worldwide. In addition to telephone call signaling, DTMF coding is also becoming popular in interactive control applications, such as telephone banking, electronic mail systems, and answering machines, wherein the user can select options from a menu by sending DTMF signals from a telephone.

A dual tone signal is represented by two sinusoidal signals whose frequencies are separated in bandwidth and which are uncorrelated in order to avoid false tone detections. In general, normal speech patterns or noise signals produce a signal with energy distributed throughout the frequency band. In some cases, speech may have sufficient energy on both DTMF frequencies to trigger a false detection.

As noted above, a DTMF signal encoder generates a DTMF signal by adding together two sinusoidal signals. A DTMF signal includes one of four tones, each having a frequency in a low frequency band, and one of four tones, each having a frequency in a high frequency band. In current DTMF systems, the following frequencies are allocated for the four tones in the low frequency band: FA=697 Hz; FD=770 Hz; FC=852 Hz, and; FD=941 Hz; and the following frequencies are allocated for the four tones in high frequency band: FE=1209 Hz; FF=1336 Hz; FG=1447 Hz, and FH=1633 Hz. The frequencies used for DTMF encoding and detection are defined by the CCITT and are accepted around the world, thus allowing dialing compatibility throughout the world.

As DTMF signals travel down a transmission line, such as a telephone line, the signals may become distorted due to attenuation or to any number of other affects, such as channel noise, radiation, etc. In addition, in some instances, voice or speech signals are propagated down a telephone line simultaneously with DTMF signals in the same frequency bandwidth. Due to noise affects or speech, a DTMF signal can be missed by the detector, referred to as "talkdown". Also, speech can have a frequency domain content similar to a DTMF signal and trigger erroneous detection, this being referred to as a "talk-off" effect. Noise other than speech can also cause adverse effects, and the receiver thus is sometimes unable to discern which DTMF signal has been detected.

The CCITT and AT&T have promulgated various standards for DTMF detectors. These standards involve various criteria, such as frequency distortion allowance, twist allowance, noise immunity, guard time, talk-down, talk-off, acceptable signal to noise ratio, and dynamic range, etc. The distortion allowance criteria specifies that a DTMF detector is required to detect a transmitted signal that has a frequency distortion of less than 1.5% and should not detect any DTMF signals that have frequency distortion of more than 3.5%. The term "twist" refers to the difference, in decibels, between the amplitude of the strongest key pad column tone and the amplitude of the strongest key pad row tone. For example, the AT&T standard requires the twist to be between −8 and +4 decibels. The noise immunity criteria requires that if the signal has a signal to noise ratio (SNR) greater than certain decibels, then the DTMF detector is required to not miss the signal, i.e., is required to detect the signal. Different standards have different SNR requirements, which usually range from 12 to 24 decibels. The guard time check criteria requires that if a tone has a duration greater than 40 milliseconds, the DTMF detector is required to detect the tone, whereas if the tone has a duration less than 20 milliseconds, the DTMF detector is required to not detect the tone. Speech immunity refers to the ability of the DTMF detector to accurately distinguish DTMF tone signals from actual speech. As described earlier, "talk-off" and "talkdown" are two criteria for evaluating speech immunity of a DTMF detector.

Originally, DTMF signal generators and detectors utilized analog circuitry to generate and decode DTMF signals. However, with the rapid advance of VLSI technology and digital signal processing (DSP) technology, many DTMF systems are now employing digital signal processors for increased accuracy and cost efficiency. The advantages of a digital DTMF generation and detection system include improved accuracy, precision, stability, versatility and reprogrammability, as well as lower chip count. The advantages of a DSP implementation of a DTMF system are especially valid for a telephone company Central Office, where DTMF detection can be simultaneously performed on multiple telephone channels.

In general, a DTMF detector examines the line or communication channel for the presence of two sinusoids using dedicated frequency domain algorithms, including modified Goertzel algorithms, DFT/FFTs, auto-correlation, zero crossing counting, and narrow band filter-based methods, among others. Once the DTMF detector has detected two tones, the DTMF detector performs various tests to ensure that the detected tones meet the above criteria.

For example, prior art detectors have performed static-only thresholding, whereby the detected tones are compared against a fixed threshold signal level, to ensure valid detection. The static thresholding ensures that the detected tones have sufficient energy to warrant detection. However, one problem with only performing static thresholding is that the threshold must be set to a high value to provide a meaningful test, thus reducing the dynamic range of the detector. A high fixed threshold adversely affects the functional dynamic range of a DTMF detector, and also makes it difficult for the detector to meet the required SNR. Other prior an detectors have only performed some form of dynamic thresholding to ensure that the detected tones have sufficient energy to warrant detection. However, detectors which only perform dynamic thresholding may not be able to discern a weak DTMF signal from idle channel noise.

Therefore, detectors which perform only one type of thresholding do not achieve sufficient accuracy in filtering non-DTMF signals. Also, one type of thresholding does not provide the flexibility for satisfying different SNR requirements. As a result, conventional DTMF detectors using a single type of thresholding generally have the disadvantage of a poor dynamic range and/or low speech immunity. Thus an improved DTMF signal detector is desired which has an increased functional dynamic range and improved speech immunity over prior designs.

SUMMARY OF THE INVENTION

The present invention comprises an improved dual tone multifrequency (DTMF) or multitone signal detector which more efficiently and reliably detects DTMF signals. The present invention uses both static and dynamic thresholding techniques to provide an increased functional dynamic range and improved speech immunity for improved detection and reduced error.

The DTMF detector according to the present invention preferably includes a coder/decoder (codec) receiver which receives signals from the transmission media. The codec samples the received analog signals and produces digital signals, i.e., digital samples. The DTMF detector also includes a digital signal processor (DSP) coupled to the codec. The DSP receives the digital samples and preferably applies the Goertzel DFT algorithm or other frequency domain techniques. The present invention further includes a memory coupled to the DSP which is used by the DSP for temporary storage of data during processing (RAM), and retrieval of data such as filter coefficients (ROM).

According to the present invention, the DTMF detector receives a plurality of digital samples of a received signal, wherein the received signal may include a plurality of tones, such as a DTMF or MTMF (multiple tone multifrequency) signal. The received signals may include DTMF or MTMF tone signals and also may include one or more speech signals and/or noise. The plurality of tones comprise two or more tones from a plurality of different uncorrelated frequencies. In one embodiment, the plurality of different uncorrelated frequencies comprise two or more frequency groups.

After receiving the digital samples, the DTMF detector calculates a frequency spectrum of the plurality of digital samples for each of the plurality of different uncorrelated frequencies. The calculation produces an energy value for each of the different uncorrelated frequencies. After the frequency domain calculation, i.e., after energy values have been calculated for each of the different uncorrelated frequencies, and after any desired gain adjustment, the DSP determines maximum values of the energy values for each of the two or more frequency groups, referred to as $M(1)$ and $M(2)$, to detect the plurality of tones in the received signal.

The DTMF detector then performs both static and dynamic thresholding according to the present invention to ensure valid tone detection. The static thresholding compares each of the $M(1)$ and $M(2)$ values with a static threshold value to ensure that the maximum energy values have a minimum energy to warrant detection. Since both static and dynamic thresholding are performed according to the present invention, the static threshold value is preferably set low, thus allowing an increased functional dynamic range. After the static thresholding is performed, dynamic thresholding is performed.

The dynamic thresholding computes the ratio of the maximum value in each sub-array to each of the other values in the respective sub-array, wherein the remaining values in the sub-array are presumed to be noise. The ratio of the maximum value in a sub-array to each of the other values in the sub-array essentially computes the signal to noise ratio (SNR) of the received signals. More specifically, the dynamic thresholding computes the ratio of the maximum value $M(1)$ in the first sub-array to each of the other values in the first sub-array. Likewise, the dynamic thresholding computes the ratio of the maximum value $M(2)$ in the second sub-array to each of the other values in the second sub-array. The dynamic thresholding then determines if the computed ratios are greater than a threshold value. If any of the ratios is not greater than the threshold value, then a SNR error is set. Setting the SNR error means that either or both the column and row frequency values do not meet the required SNR. If the SNR error is set, no detection is indicated.

The present invention thus comprises a method for improving the DTMF detector's functional dynamic range and noise immunity by performing static thresholding followed by dynamic thresholding. This method increases the functional input signal dynamic range and has greater speech/noise immunity, i.e., is more able to avoid detection triggered by speech or noise. The static and dynamic thresholding steps eliminate invalid DTMF tones based on both signal level and signal/noise ratio. The use of both static and dynamic thresholding allows a small static threshold to be selected, thus providing the DTMF detector with a wider dynamic range. The dynamic thresholding essentially performs a signal/noise ratio estimate, preferably using the ratio between the maximum value in the group and the other values in the sub-array. The dynamic threshold comparison determines an acceptable signal/noise ratio, which effectively prevents noise or speech-triggered detection, i.e., provides better speech immunity.

Thus the present invention tests the maximum energy values from each frequency group using both static and dynamic techniques. In the preferred embodiment, the static threshold is set relatively low to provide a large functional dynamic range, and the dynamic threshold is set according to the SNR requirement. For example, if a standard requires a SNR of 12 decibels, then the dynamic thresholding is set to ensure that $M(1)$ is at least 4 times as big as other values in the sub-array. This allows very small DTMF signals (wide dynamic range) to be detected, as long as the signals have an acceptable signal to noise ratio. This also effectively eliminates most idle channel noise, speech, and white noise.

BRIEF DESCRIPTION OF THE DRAWINGS

A better understanding of the present invention can be obtained when the following detailed description of the preferred embodiment is considered in conjunction with the following drawings, in which:

FIG. 10 illustrates operation of twist checking functions in the flowchart of FIG. 2.

DETAILED DESCRIPTION OF THE PREFERRED EMBODIMENT

Incorporation by Reference

The following U.S. patents and references are hereby incorporated by reference:

U.S. Pat. No. 5,408,529 titled "Dual Tone Detector Operable in the Presence of Speech or Background Noise and Method Therefor"—Greaves, issued Apr. 18, 1995, is hereby incorporated by reference.

U.S. Pat. No. 5,428,680 titled "DTMF Signal Receiving Apparatus Equipped With a DTMF Signal Judging Circuit"—Murata et al., issued Jun. 27, 1995 is hereby incorporated by reference.

U.S. Pat. No. 5,257,309 titled "Dual Tone Multifrequency Signal Detection and Identification Methods and Apparatus"—Brandman et al., issued Oct. 26, 1993 is hereby incorporated by reference.

U.S. Pat. No. 5,353,345 titled "Method and Apparatus for DTMF Detection"—Galand, issued Oct. 4, 1994 is hereby incorporated by reference.

U.S. Pat. No. 5,426,696 titled "Method of Improving Receiver Sensitivity and Speech Immunity With DTMF-Reception"—Zimbrek, issued Jun. 20, 1995 is hereby incorporated by reference.

U.S. Pat. No. 5,325,427 titled "Apparatus and Robust Method for Detecting Tones"—Dighe, issued Jun. 29, 1994 is hereby incorporated by reference.

"Digital Signal Processing Applications Using the ADSP-2100 Family", from Analog Devices Corporation, Volume 1, Chapter 14, pages 441–500 is hereby incorporated by reference in its entirety.

DTMF Detector

The present invention comprises a DTMF detector which performs both static and dynamic thresholding according to the present invention. The DTMF detector is comprised in a digital telephone answering machine in the current embodiment. However, it is noted that the present invention may be used in various other applications, including telephone switching and interactive control applications, telephone banking, fax on demand, etc. The DTMF detector of the present invention may also be used as the DTMF detector in a telephone company Central Office, as desired.

The present invention was designed to meet CCITT and AT&T standards, although the invention can be reprogrammed or undergo minor modifications to meet other telecommunication standards. The preferred embodiment was developed to perform DTMF detection functions and preferably comprises a dual tone detector which detects two tones, wherein each tone is one of a plurality of predetermined tones from two respective frequency groups. However, the present invention may comprise a multi tone multi frequency (MTMF) detector for detecting a greater number of tones in a received signal, i.e., two or more tones. The two or more tones may be from two or more different frequency groups or from a single frequency group, as desired. Thus the system and method of the present invention may be used for detecting any number of tones in a received signal.

Figure 1:
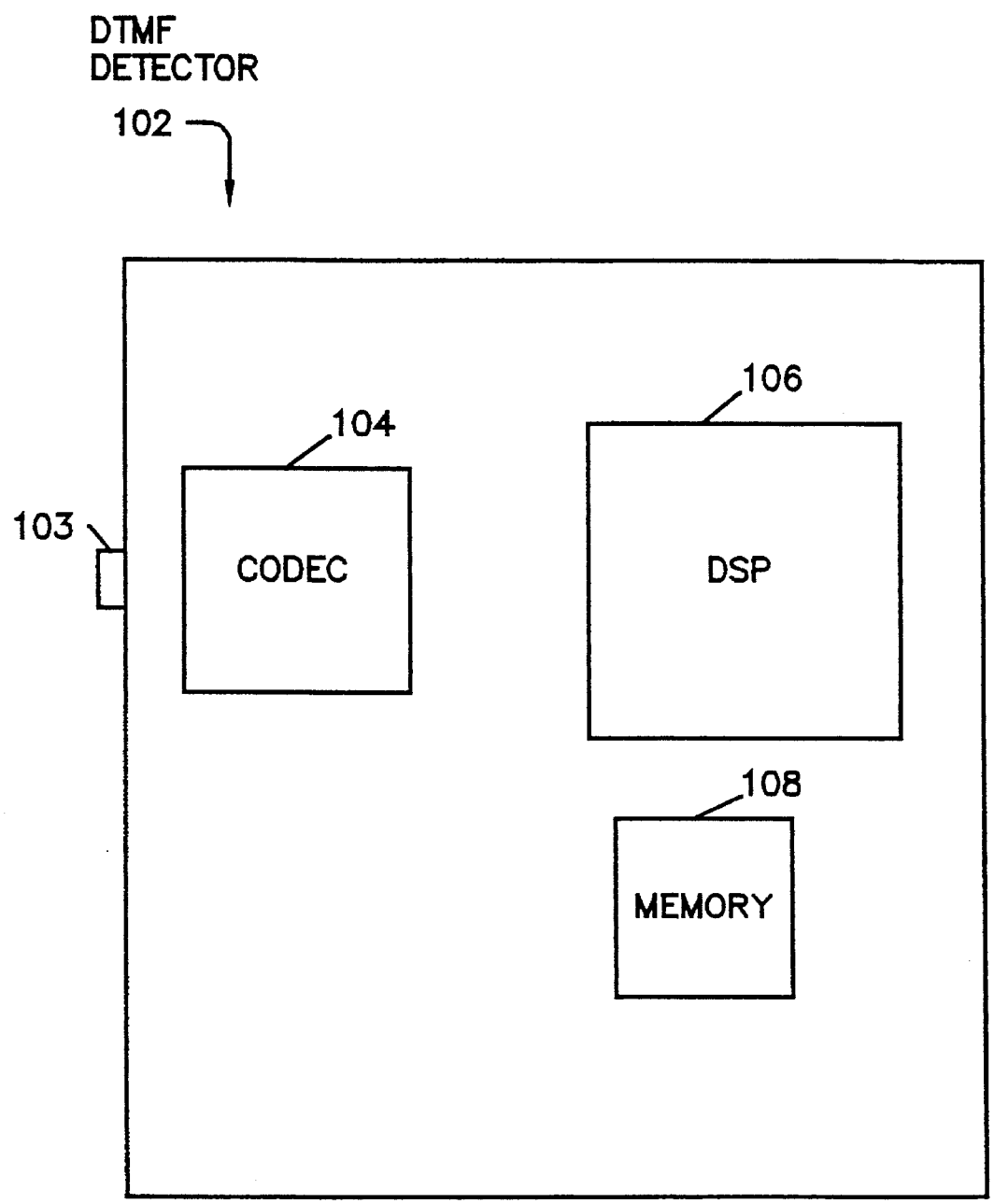
FIG. 1 is a block diagram of the DTMF detector of the present invention.

FIG. 1—Block Diagram

Referring now to FIG. 1, a block diagram of a DTMF detector 102 according to the present invention is shown. As shown, the DTMF detector 102 preferably comprises a port or connector or other means 103 for receiving analog or digital signals. The port 103 is adapted for coupling to a communications medium, such as a phone line, cable or other transmission line. It is noted that the port 103 may comprise any of various means or connectors for coupling to a communications line.

The DTMF detector 102 also preferably comprises a coder/decoder (codec) receiver 104 coupled to the port which receives an analog signal and converts the analog signal into digital format. The codec receiver 104 preferably samples the analog signal at 8 kHz and utilizes pulse code modulation (PCM) or other suitable techniques to produce corresponding digital data. The codec chip 104 preferably comprises linear analog to digital (A/D) converters and digital to analog (D/A) converters. The codec receiver 104 preferably comprises all the necessary A/D, D/A, sampling and filtering circuitry for bi-directional analog digital interfacing. Once analog to digital conversion has been performed, digital data or digital samples are generated based upon the analog signal.

It is noted that the received signal may be compressed or companded, and thus digital data produced by the A/D converter in the codec 104 may be companded, i.e., may comprise logarithmically compressed digital data. As is well-known in the art, companding refers to logarithmically compressing a signal at the source and expanding the signal at the destination to obtain a high end-to-end dynamic range while reducing dynamic range requirements within the communication channel. In this instance, the codec receiver 104 logarithmically expands the data to a linear format, preferably a 16 bit linear format.

In one embodiment, the port 103 in the DTMF detector 102 receives digital signals (i.e., linear or logarithmic PCM) directly from the communication channel or transmission media, and thus a codec 104 is not required in the DTMF detector 102 for analog to digital conversion.

The DTMF detector 102 also preferably includes a digital signal processor (DSP) 106 coupled to the codec 104. The DSP 106 is preferably from the ADSP-2100 family from Analog Devices, Inc. Other equivalent DSPs are acceptable, although a DSP that can perform 16×16 bit hardware multiplication is preferred for accuracy reasons. It is noted that a software multiplier may be used, although the operating speed will be significantly reduced. In the preferred embodiment, the DSP 106 and codec 104 are comprised on a single silicon chip.

The DSP 106 receives the digital samples and preferably applies frequency domain techniques, preferably the Goertzel DFT algorithm, using variable or differing frame lengths according to the present invention. The Goertzel DFT algorithm divides the sampled time domain signal into a plurality of discrete blocks or frames and then performs Fourier techniques on each frame to obtain energy values in the frequency domain for each of the possible tones. In the preferred embodiment, the DTMF detector 102 utilizes differing frame widths for different ones of the possible tone frequencies. In other words, the DTMF detector 102 utilizes differing frame widths for at least a plurality of the possible tone frequencies.

The DTMF detector 102 further includes a memory 108 coupled to the DSP which is used by the DSP 106 for storage and retrieval of data. Preferably, the memory comprises a RAM (random access memory) for processing storage and loading of program at the time of operation, and a ROM (read-only memory) for storage of fixed values, such as filter coefficients and other parameters used by the program. The program is also preferably stored in the ROM before loaded into RAM. The memory requirement for the DTMF detector alone is about 2.0 kbytes of ROM and 200 bytes of RAM. The memory requirement is architecturally dependent and also depends on implementation. It is noted that the memory 108 may comprise any of various types or sizes, as desired.

It is noted that the present invention may include a general purpose microprocessor instead of DSP 106. The present invention may also include dedicated digital and/or analog hardware instead of, or in addition to, the DSP 106. Thus, although the following description describes the DSP 106 performing the present invention, it is noted that the present invention may be performed by a general purpose microprocessor, or the present invention may be at least partially or totally implemented in digital or analog logic, as desired. The use of a programmable DSP 106 is the preferred embodiment of the invention.

Figure 2:
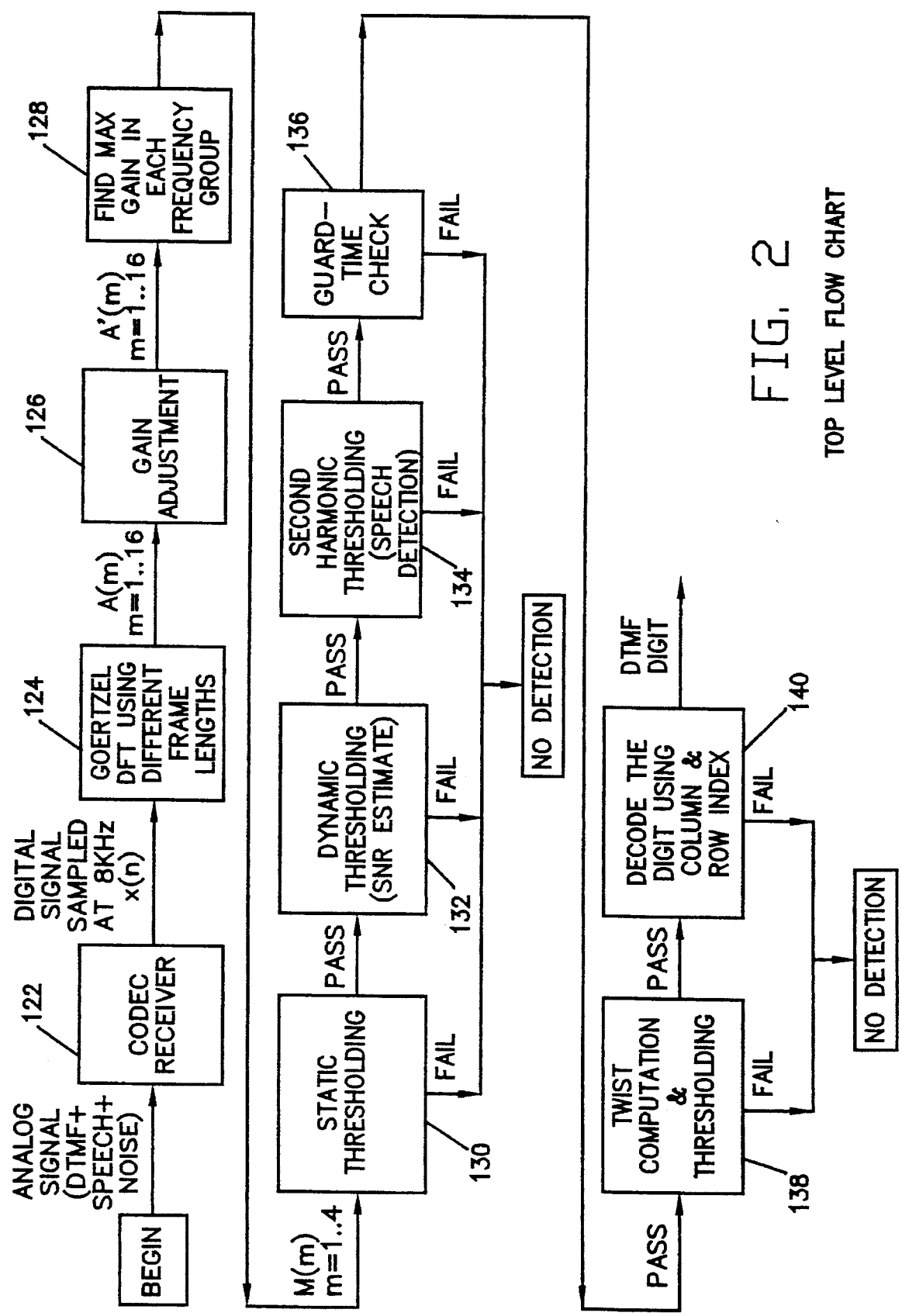
FIG. 2 is a flowchart diagram illustrating operation of the DTMF detector of the present invention.

FIG. 2—Flowchart Diagram

Referring now to FIG. 2, a flowchart diagram illustrating operation of the DTMF detector 102 according to the preferred embodiment of the present invention is shown. The DTMF detector 102 is coupled to a transmission media. As shown, the DTMF detector 102 receives an analog signal and determines whether dual tone multi frequency (DTMF) signals are comprised within the received signal. As shown, the received analog signal may comprise one or more of a DTMF signal, a speech or voice signal, or noise. In step 122, the codec 104 in the DTMF detector 102 receives the analog signal and converts the analog signal into digital format. In step 122 the codec receiver 104 preferably samples the analog signal at 8 kHz and performs pulse code modulation (PCM) or other suitable techniques to produce corresponding digital data. As shown, the codec receiver 104 produces a digital signal referred to as x(n), which is sampled at 8 kHz.

It is also noted that the received signal may be logarithmically compressed or companded, and thus step 122 may further comprise logarithmically expanding the compressed data to produce linear data.

The following comprises a brief description of steps 124–140, and a more detailed description of each of the steps follows. In step 124 the DSP 106 receives the digital signal x(n) from the codec 104 and performs the Goertzel DFT using differing frame lengths. In step 124 the DSP 106 produces a plurality of energy values A(m) where m=1–16. The plurality of energy values A(m) comprise energy values at each of the two sets of four frequency tones for the first and second harmonics of the frequencies. In step 126 the DSP 106 adjusts the gain of each of the energy values A(m) to compensate for differing energy content due to the differing frame lengths. The DSP 106 in step 126 produces a plurality of adjusted energy values A'(m). In step 128 the DSP 106 determines the maximum level of the energy values A'(m) in each frequency group.

In the following steps 130–138 the DSP 106 performs various tests to ensure valid tone detection. In steps 130 and 132 the DSP 106 performs static and dynamic thresholding, respectively, according to the present invention, to ensure that the energy values A'(m) meet certain basic criteria. The static and dynamic thresholding performed in steps 130 and 132 eliminate invalid DTMF tones based on both signal level and signal/noise ratio.

After static and dynamic thresholding are performed in steps 130 and 132, in step 134 the DSP 106 performs second harmonic thresholding to prevent detection triggered by speech. The DTMF detector of the present invention examines the second harmonics of the fundamental DTMF frequencies using a novel ratio comparison method, which further distinguishes speech signals from DTMF signals.

In step 136 the DSP performs a guard time check to evaluate the frequency domain results and to ensure that the signal lasts at least a certain amount of time. The guard time check evaluates the maximum energy values in relation to prior and subsequent frames for improved detection. In step 138, the DSP performs twist computation and thresholding. The present invention uses a novel twist computation technique which only performs the twist computation when the received signal is deemed stable, thus increasing accuracy. After the twist computation is performed in step 138, in step 140 the DSP decodes the digit using the column and row indices and outputs the pressed DTMF digit from the received DTMF signals. As noted in FIG. 2, if any of the steps 130–140 fail, then no detection is indicated.

Step 124—Goertzel DFT with Variable Frame Lengths

Referring again to FIG. 2, in step 124 the DSP 106 receives the digital signal x(n) from the codec 104 and preferably performs the Goertzel DFT for each of the possible tone frequencies using varying or differing frame lengths. As discussed in the background section, decoding a DTMF signal involves detecting two tones in the received signal and then determining the number pressed by the user at the sending end based on the values of the detected tones. More generally, decoding a MTMF signal involves detecting a plurality of tones in the received signal. In the preferred embodiment, the system and method performs the Goertzel DFT for each of the possible tone frequencies using varying or differing frame lengths. However, it noted that any of various types of frequency domain methods, with or without differing frame widths, may be used as desired.

CCITT recommendations Q.23 and Q.24 in the "Red Book", Volume VI define two groups of frequencies that are used for in-band signaling. Group 1 comprises the frequencies 697 Hz, 770 Hz, 852 Hz, and 941 Hz, and these frequencies identify the rows of the telephone keypad, and Group 2 comprises the frequencies 1209 Hz, 1336 Hz, 1477 Hz and 1633 Hz, and these frequencies identify the columns of the telephone keypad. The DTMF signals each contain one row and one column frequency, and these signals are assigned using the following table.

TABLE 1

| DTMF frequency assignments | | | | |
|---|---|---|---|---|
| | 1209 Hz | 1336 Hz | 1477 Hz | 1633 Hz |
| 697 Hz | 1 | 2 | 3 | A |
| 770 Hz | 4 | 5 | 6 | B |

TABLE 1-continued

| | DTMF frequency assignments | | | |
|---|---|---|---|---|
| | 1209 Hz | 1336 Hz | 1477 Hz | 1633 Hz |
| 852 Hz | 7 | 8 | 9 | C |
| 941 Hz | * | 0 | # | D |

The detection of the dual tones is performed by mathematically transforming the input time domain signal into the frequency domain using various Fourier transform techniques. As is well-known, the discrete Fourier transform (DFT) is commonly used to transform discrete time domain signals into their discrete frequency domain components. As also noted in the background section, the Goertzel algorithm is a popular method for performing the DFT computation. The Goertzel algorithm offers the accuracy of a DFT-based calculation, while having increased computational efficiency that is comparable to narrow band filter-based algorithms.

In general, the conventional usage of the Goertzel algorithm is similar to the DFT method and is performed by computing frequency domain values at the desired discrete points. As a result, the Goertzel algorithm also has the disadvantage of the DFT, whereby the computed results may not be sufficiently close to the desired frequencies desired to be detected, thus severely reducing accuracy. This is referred to as the leakage effect. In other words, the DTMF detector 102 is designed to detect dual tones which will occur at specified predefined frequencies. In the preferred embodiment, these frequencies are 697 Hz, 770 Hz, 852 Hz, 941 Hz, 1209 Hz, 1336 Hz, 1477 Hz, and 1633 Hz. The frequencies used in the DTMF standard are not spaced at equal increments but rather are deliberately designed to be uncorrelated for more accurate detection.

As a result, if the conventional method of a fixed N (frame size) is used in the Goertzel algorithm, the frequencies are not optimally aligned at the frequency bins. The effect is that the desired outputs are not exactly at the frequency bins-(multiples of Fs/N). This causes the energy to be distributed among neighboring frequency bins, referred to as leakage. Leakage can severely degrade the accuracy of the frequency domain outputs. The following table illustrates the effect of leakage using an example of the Goertzel algorithm for DTMF frequency 852 Hz (N=205).

TABLE 2

The effect of leakage

| error in K (%) | 0.01 | 0.05 | 0.1 | 0.5 | 1.0 | 5.0 |
|---|---|---|---|---|---|---|
| output gain (dB) | 94.0 | 80.6 | 74.7 | 60.9 | 49.6 | 43.6 |
| output error(dB) | >13.4 | >19.3 | >33.1 | >44.4 | >50.4 | |

Note: K = N*f/fs

In general, it has been found that a fixed-frame size of 205 points produces the least error in a Goertzel/DFT computation. The inherent property of the DFT requires FNT to be equal to one, where F is the frequency domain resolution, N is the frame size in number of samples, and is also the computed number of outputs in the frequency domain, and T is the smallest period and equals 1/Fs, where Fs is the sampling frequency. In telephony applications, the period T is equal to 1/Fs=1/8000. Thus, in order to achieve sufficient resolution, the frame size N is required to be very large. As a result, detection of speech is generally slow and computational costs are higher for each result. Even worse, a large frame size may result in the detection speed not meeting telecommunications standards.

Therefore, prior an DTMF detectors which utilize the Goertzel algorithm and/or the DFT and which utilize a fixed frame size N only compute frequency domain values in multiples of Fs/N, wherein Fs is the sampling frequency, typically 8000 Hz for telephony applications. Therefore, for example, if Fs=8000 Hz and N=100 sample points, the Goertzel algorithm only computes results at 80 Hz, 160 Hz, 240 Hz, etc. Therefore, in summary, since the DTMF standard frequency values are designed to be uncorrelated, in general, no single frame size value N can be chosen which results in all of the desired frequencies lined up at the bins.

Therefore, the system of the preferred embodiment performs the Goertzel algorithm utilizing a varying or differing frame size N for a plurality of the DTMF frequencies to provide increased accuracy and efficiency. The DTMF detector 102 of the present invention preferably uses a different frame size for different DTMF tone frequencies and then adjusts the gain after the frequency domain values have been computed. This provides increased accuracy and speed over prior art methods. The DTMF detector 102 of the present invention provides better frequency distortion allowance and better twist allowance.

Figure 3:
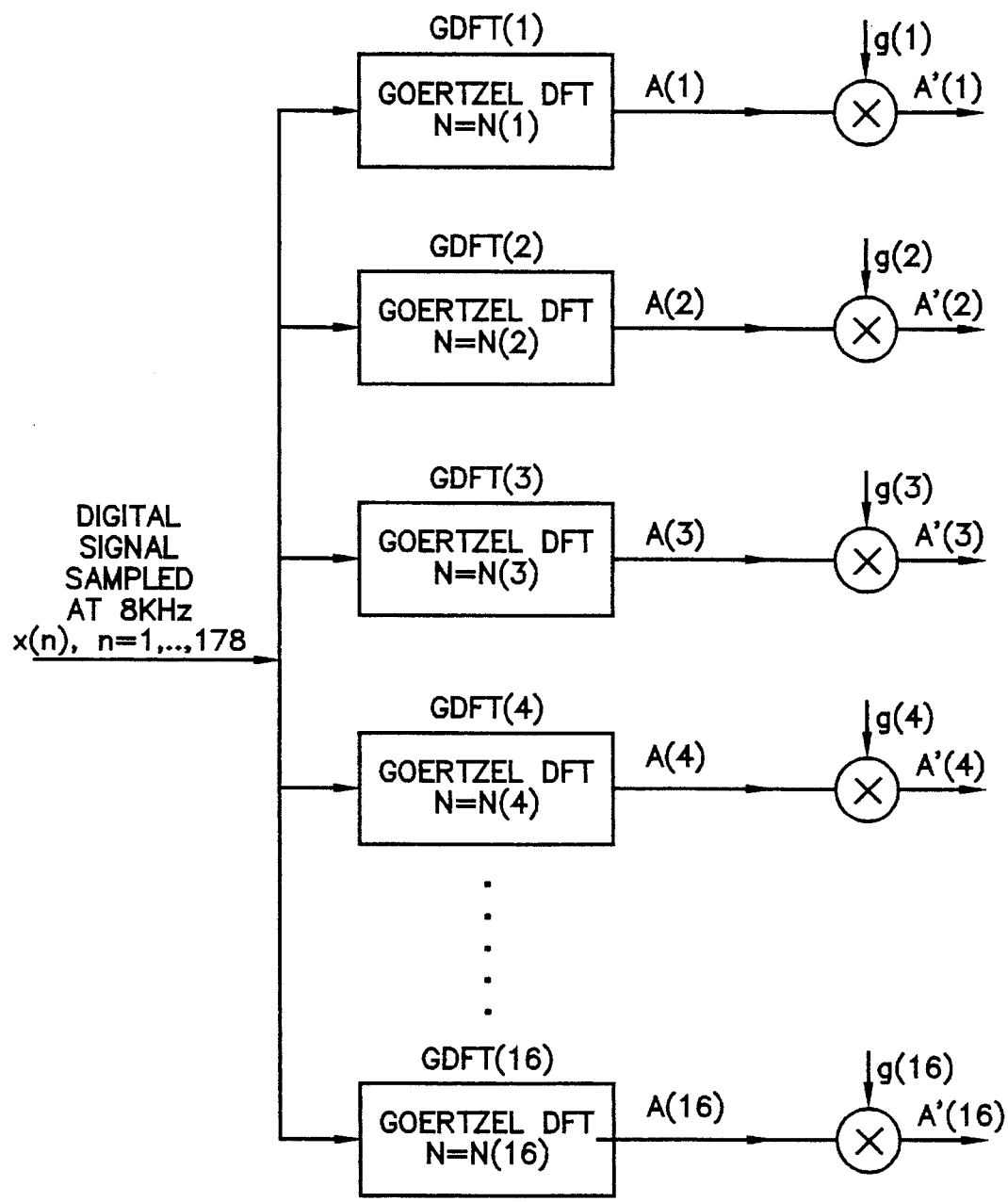
FIG. 3 illustrates a plurality of filters in the DTMF detector of FIG. 1, which apply the Goertzel algorithm using a variable frame length according to the present invention.

Referring again to FIG. 2, in step 124 the DSP 106 applies the Goertzel DFT method using different frame lengths. As shown, the DSP 106 receives a digital signal referred to as x(n), wherein the digital signal x(n) comprises a plurality of samples of a received signal. Referring now to FIG. 3, The DSP effectively computes 16 Goertzel DFTs with different frame lengths N(1)–N(16). The different frame lengths for each of the Goertzel DFTs are as follows:

N(1), N(9)=172;

N(2), N(10)=177;

N(3), N(11)=178;

N(4), N(12)=178;

N(5), N(13)=172;

N(6), N(14)=168

N(7), N(15)=168

N(8), N(16)=176

As shown in FIG. 3, the operation of the DSP is represented as 16 Goertzel DFT blocks labeled GDFT (1)–GDFT-(16). Each of the Goertzel GDFT blocks, GDFT (1)–GDFT (16) produces a respective value A(1)–A(16). The values A(1)–A(16) are comprised of four smaller sub-arrays. The output of each Goertzel DFT block is proportional to the square root of energy at the respective frequency. Thus the Goertzel DFT outputs comprise frequency domain values. In the preferred embodiment, the system computes the square of the frequency domain values to produce energy values, and the energy values are then used in subsequent computations.

The values A(1)–A(16) are each provided to respective multipliers which multiply the respective A(n) value with a respective gain. These multipliers correspond to the gain adjustment in step 126 of FIG. 2.

Figure 4:
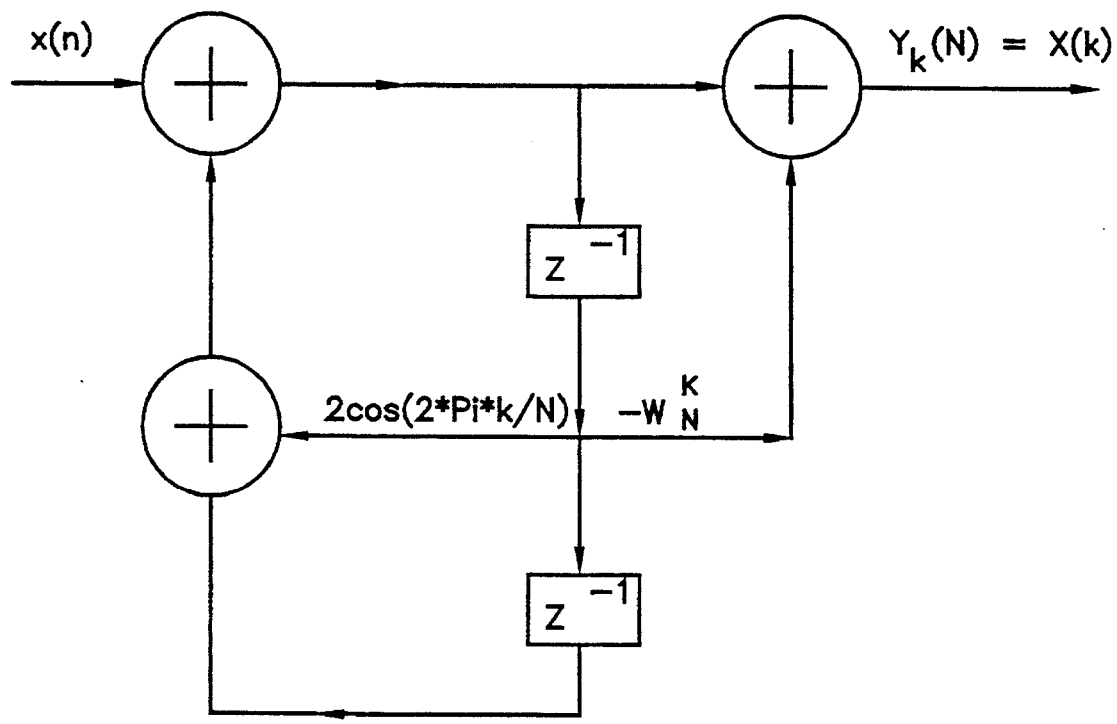
FIG. 4 illustrates operation of the Goertzel algorithm.

Referring now to FIG. 4, a diagram illustrating operation of the Goertzel algorithm is shown. As noted above, the Goertzel algorithm evaluates the DFT of input data with reduced computation and with increased efficiency. Operation of the Goertzel algorithm is similar to a filter implementation, wherein the Goertzel algorithm does not require a buffer of input data items prior to operation, but rather computes a new output result with each occurrence of a new input sample. As shown in FIG. 4, the Goertzel algorithm performs a second order recursive computation of the DFT by computing a new Yk(n) output for every new input sample x(n). The DFT result, referred to as X(k) is equivalent to Yk(n) when n=N, i.e., X(k)=Yk(N). As shown in FIG. 4, the operation of the Goertzel algorithm can be divided into two phases. The first phase involves computing the feedback legs in FIG. 4. The second phase computes the feed forward when n=N and thus evaluates the value X(k). As discussed above, in the preferred embodiment the DSP 106 performs the Goertzel algorithm shown in FIG. 4 using a different frame length for different ones of the DTMF frequency values.

After the Goertzel DFT is applied to the received digital signal using variable frame lengths in step 124, the result is a plurality of frequency spectra values A(m) corresponding to the 8 DTMF standard frequencies or tones for the first and second harmonics.

The following two tables compare the Goertzel algorithm implementation using a fixed frame size and a variable frame size. The first table below illustrates an example using N=205 as the fixed frame size and shows the K errors. It is noted that a fixed frame size of N=205 is the best possible selection and produces the least maximum error for all K values.

$$K=N*f/fs=205*f/8000=0.025625f$$

| DTMF frequency | K(floating point) | K (integer) | absolute error of K | % error of K |
| --- | --- | --- | --- | --- |
| 697 Hz | 17.861 | 18 | 0.139 | 0.78% |
| 770 Hz | 19.731 | 20 | 0.269 | 1.36% |
| 852 Hz | 21.833 | 22 | 0.167 | 0.76% |
| 941 Hz | 24.113 | 24 | 0.113 | 0.47% |
| 1209 Hz | 30.981 | 31 | 0.019 | 0.06% |
| 1336 Hz | 34.235 | 34 | 0.235 | 0.69% |
| 1477 Hz | 37.848 | 38 | 0.152 | 0.40% |
| 1633 Hz | 41.846 | 42 | 0.154 | 0.37% |

The transfer function for the Goertzel algorithm feed-back phase is $$H_1(z) = \frac{1}{1 - 2\cos(2\pi k/N)z^{-1} + z^{-2}}$$

where $$z = e^{-j2\pi f/fs}$$

which operates on every sample in the frame. At the end of the frame, a feed-forward phase is computed using:

$$H_2(z) = 1 - W^*_N z^{-1} = 1 - e^{-j2\pi k/N} \cdot z^{-1}$$

Therefore, the overall transfer function for Goertzel algorithm is:

$$H(z) = H_1(z) \cdot H_2(z)$$
$$= \frac{1 - e^{-j2\pi k/N} \cdot z^{-1}}{1 - 2\cos(2\pi k/N)z^{-1} + z^{-2}}$$

This is a narrow band-pass filter and has very sharp transition. Based on the above information, it is very important to reduce the error of the K values.

As discussed above, the system and method of the present invention uses different N values for different frequencies. The table below describes the different N values or frame sizes used according to the preferred embodiment of the invention for the different DTMF tone frequencies. The table also illustrates the associated K errors:

| Std. DTMF frequency | N | K (floating point) | K (integer) | Absolute error of K | % error of K |
| --- | --- | --- | --- | --- | --- |
| 697 Hz | 172 | 14.985 | 15 | 0.014 | 0.09% |
| 770 Hz | 177 | 17.036 | 17 | 0.036 | 0.20% |
| 852 Hz | 178 | 18.957 | 19 | 0.043 | 0.20% |
| 941 Hz | 178 | 20.937 | 21 | 0.063 | 0.30% |
| 1209 Hz | 172 | 25.993 | 26 | 0.007 | 0.02% |
| 1336 Hz | 168 | 28.056 | 28 | 0.056 | 0.20% |
| 1477 Hz | 168 | 31.017 | 31 | 0.017 | 0.05% |
| 1633 Hz | 176 | 35.926 | 36 | 0.074 | 0.20% |

Using this method, the present invention reduces the K error to less than 0.3%, as compared with up to 1.36% for prior art methods using fixed N. In addition, the N values or frame sizes are reduced from 205 to 178 or less, which allows earlier detection by 15% or more. Therefore, the DSP 106 preferably uses up to 178 digital speech samples which are input to the Goertzel algorithm. A different number of these samples are used for the different tone frequencies. Application of the Goertzel algorithm produces an array of 16 frequency domain values, wherein the outputs are basically discrete Fourier transform results. Eight of these values are for the fundamental frequencies and eight are for the second harmonics. This is illustrated in FIGS. 3 and 4.

Most DFT/Goertzel based algorithms have difficulty meeting the required frequency distortion allowance. The frequency distortion allowance requires that all DTMF signals with a certain percentage of frequency distortion have to be detected as valid DTMF tones. However, if the distortion exceeds a certain larger percentage, then detection must be denied. The frequency distortion allowance criteria is described below.

Let Fdtmf be a standard frequency and F is the actual frequency. Then:

if Fdtmf*(1−1.5%)<F<Fdtmf*(1+1.5%), then it is a valid tone if F>Fdtmf*(1+3.5%) or F<Fdtmf*(1−3.5%) then it is not a valid tone.

One advantage of using variable or differing frame sizes is that the DTMF detector 102 more easily meets the required frequency distortion allowance. If the desired frequency is located exactly at the bin (the detecting frequency) of the Goertzel algorithm, then +2.5% error in the input frequency decreases the output the same amount as a −2.5% error in the signal. The reason is that both errors are at the same distance from the bin. This is not the case if the desired frequency has error relative to the bin, it being noted that error is unavoidable if a fixed frame size is used. For example, assume that the desired frequency is 2.0% bigger than the frequency bin. In this example, −2.0% error in the input signal moves the frequency nearer to the bin and generates the largest output result. On the other hand, +2.5% error moves the frequency further away from the bin and generates a very small output. The asymmetric effect makes it very difficult to set the threshold for frequency distortion allowance test, therefore not meeting the very stringent telecom standards. Significant computational resources are necessary to determine if an energy value is at the right side or left side of the frequency bin. Therefore, setting different thresholds for left and right side distortion, i.e., actual frequency greater or smaller than the desired frequency, is not an adequate solution.

Step 126—Gain Adjustment

In step 126 the DSP 106 preferably performs gain adjustment, as shown in FIG. 3. Calculating the frequency spectrum using different frame lengths N produces differing energy contents in a plurality of the energy values. Thus the DTMF detector 102 preferably multiplies a gain value with each of the energy values to adjust the gain of each of the energy values. It is noted that using differing frame widths provides better results even without gain adjustment. However, gain adjustment is desirable since different frame lengths have been applied to different frequencies and also because different Goertzel algorithm transfer functions have different gains at the narrow pass band. Thus the system and method of the preferred embodiment preferably adjusts the gain in order to more correctly evaluate the results in the array A[1 . . . 16]. After the gain adjustment in step 126, the result is a modified frequency spectra values A'(m).

The gains were computed using mathematical methods and also verified using laboratory methods. The gain adjustments used in the preferred embodiment are listed below:

| Freq(Hz): | Gain factor: |
|---|---|
| 697 | 1.00000000 |
| 770 | 0.98902064 |
| 852 | 0.97439963 |
| 941 | 0.97849229 |
| 1209 | 1.00475907 |
| 1336 | 1.03484721 |
| 1477 | 1.02940728 |
| 1633 | 0.99550578 |

In the preferred embodiment, the DTMF detector 102 does not use the second harmonic outputs for computing twist. Therefore, gain adjustment for the second harmonics is less important. Thus, in the preferred embodiment, gain adjustment for the second harmonics is not performed in order to save computational resources. Assuming the gain factor for frequency F1 is G1, then the gain adjustment is calculated by performing:

$$A'(1)=G1*A(1)$$

This is performed on the first eight elements in the Goertzel output array A[1, . . . , 8], i.e., the first harmonics, and a new array A'[1, . . . , 16] is generated. The new array comprises the gain adjusted Goertzel DFT output. It is noted that the array elements A[9 . . . 16] are not adjusted and thus these values remain the same, i.e., A'[9 . . . 16]=A[9 . . . 16].

Step 128—Determining the Maximum Gain in Each Frequency Group

As noted above, the gain adjustment performed in step 126 produces four sub-arrays of the first and second harmonics of the row and column frequencies of the DTMF standard frequencies. In other words, the array A'[1, . . . , 16] is comprised of four smaller arrays. Sub-array A'[1, . . . , 4] comprises the values for the fundamental row frequencies and determines the row to which the pushed key belongs. Sub-array A'[5, . . . , 8] comprises the values for the fundamental column frequencies and determines the column to which the pushed key belongs. The sub-array A'[9, . . . , 12] comprises the DFT values for the second harmonics of the row frequencies, and the sub-array A'[13, . . . , 16] comprises the values for the second harmonics for the column frequencies.

Figure 5:
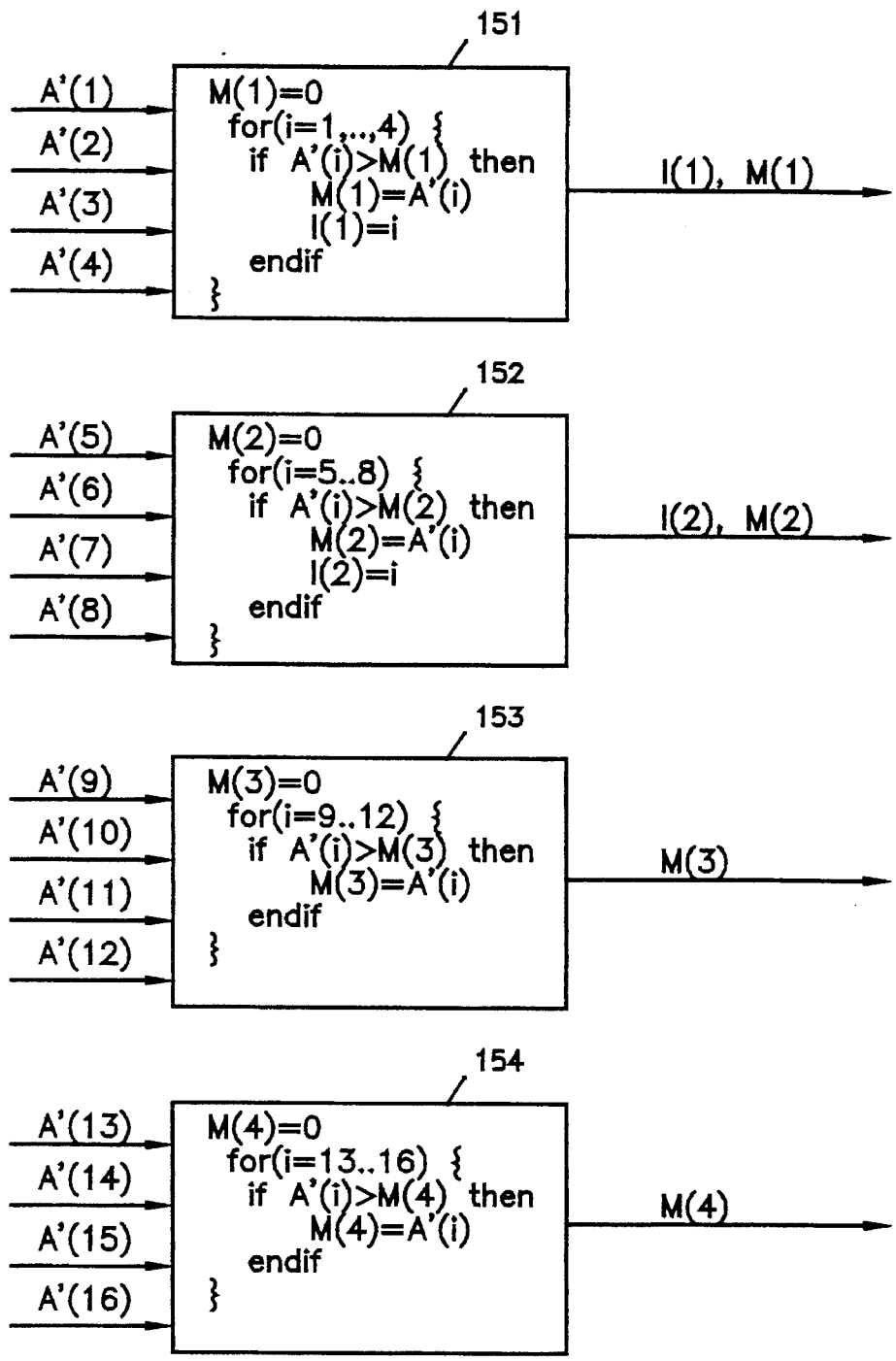
FIG. 5 is a block diagram illustrating logic which finds the maximum gain in each group of detected tones.

Referring now to FIG. 5, a block diagram is shown illustrating operation of step 128 in FIG. 2. As shown in FIG. 5, operation of the DSP 106 is represented as four blocks 151, 152, 153, and 154, wherein each of the blocks determines the value in the respective sub-array that has the maximum value or gain. The blocks 151 and 152 for the two first harmonic sub-arrays also obtain the respective index of the maximum gain value. The blocks 151 and 152 for the sub-arrays A'[1, . . . , 4] and A'[5, . . . , 8] each provide outputs comprising the maximum value in the sub-array and the respective index. The blocks 153 and 154 for the sub-arrays A'[9, . . . , 12] and A'[13, . . . , 16] provide outputs comprising the respective maximum values in each of the sub-arrays.

Thus in step 128 the DSP 106 determines the maximum value in the first two sub-arrays and the respective indices within the sub-array. This step can be described using pseudo code:

```
M[1]= 0; I[1]= 0;
for (i = 1 to 4) {
    if A'[i]>M[1] then
        M[1] = A'[i];
        I[1] = i;
    endif
}
M[2] = 0; I[2]= 0;
for (i = 5 to 8) {
    if A'[i]>M[2] then
        M[2] = A'[i];
        I[2] = i;
    endif
}
```

Thus, in step 128 the DSP 106 obtains the maximum values of the row and column frequency group (M[1], M[2]) and their respective index (I[1], I[2]) for the first harmonic sub-arrays. In the preferred embodiment, the DSP 106 does not determine the indices for the second harmonics. Rather the DSP 106 only obtains the maximum frequency output for the second harmonics of the row frequency, M[3], and the maximum frequency output for the second harmonics of the column frequency, M[4], as shown in FIG. 5.

Steps 130 and 132—Static and Dynamic Thresholding

The system and method of the present invention performs both static thresholding and dynamic thresholding. The static and dynamic thresholding of the present invention improves the DTMF detector's functional dynamic range and noise immunity. The present invention thus increases the functional input signal dynamic range and has greater speech/noise immunity, i.e., is more able to avoid detection triggered by speech or noise. The static and dynamic thresholding performed in steps 130 and 132 eliminate invalid DTMF tones based on both signal level and signal/noise ratio. The use of both static and dynamic thresholding allows a small static threshold to be selected, thus providing the DTMF detector with a wider dynamic range. The dynamic thresholding in step 132 essentially performs a signal/noise ratio estimate, preferably using the ratio between the maximum value in the group and the other values in the sub-array. The dynamic threshold performed in step 132 performs a threshold comparison with the computed signal/noise ratio, which effectively prevents noise or speech-triggered detection, i.e., provides better speech immunity.

Figure 6:
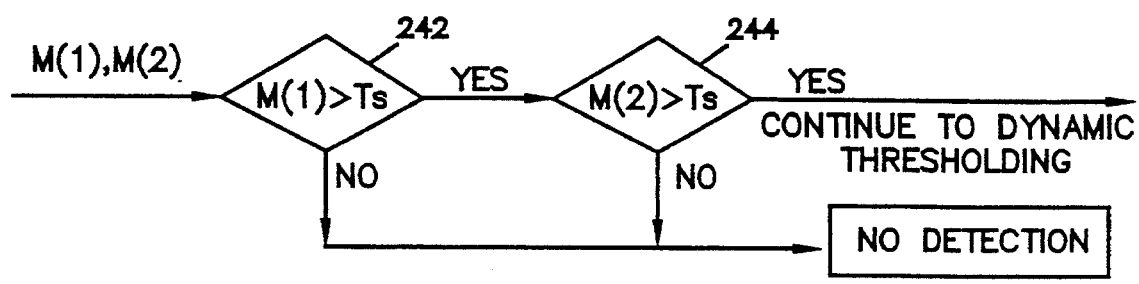
FIG. 6 illustrates operation of static thresholding in the flowchart diagram of FIG. 2.

Referring now to FIG. 6, a flowchart diagram illustrating operation of the static thresholding step 130 is shown in FIG.

1. As shown, the maximum values from the first two sub-arrays corresponding to the first harmonic row and column frequency values are received in the static thresholding step 130. As shown, in step 242 the DSP 106 determines if M(1)>Ts, i.e., if the maximum value of the first sub-array is greater than Ts. If not, then no detection occurs and operation completes. If M(1)>Ts in step 242, then in step 244 the DSP determines if the value M(2) is greater than Ts. If not, then again no detection is determined. If both M(1) and M(2) are greater than the threshold value Ts, then dynamic thresholding is performed on these values in step 132 of FIG. 2.

Figure 7:
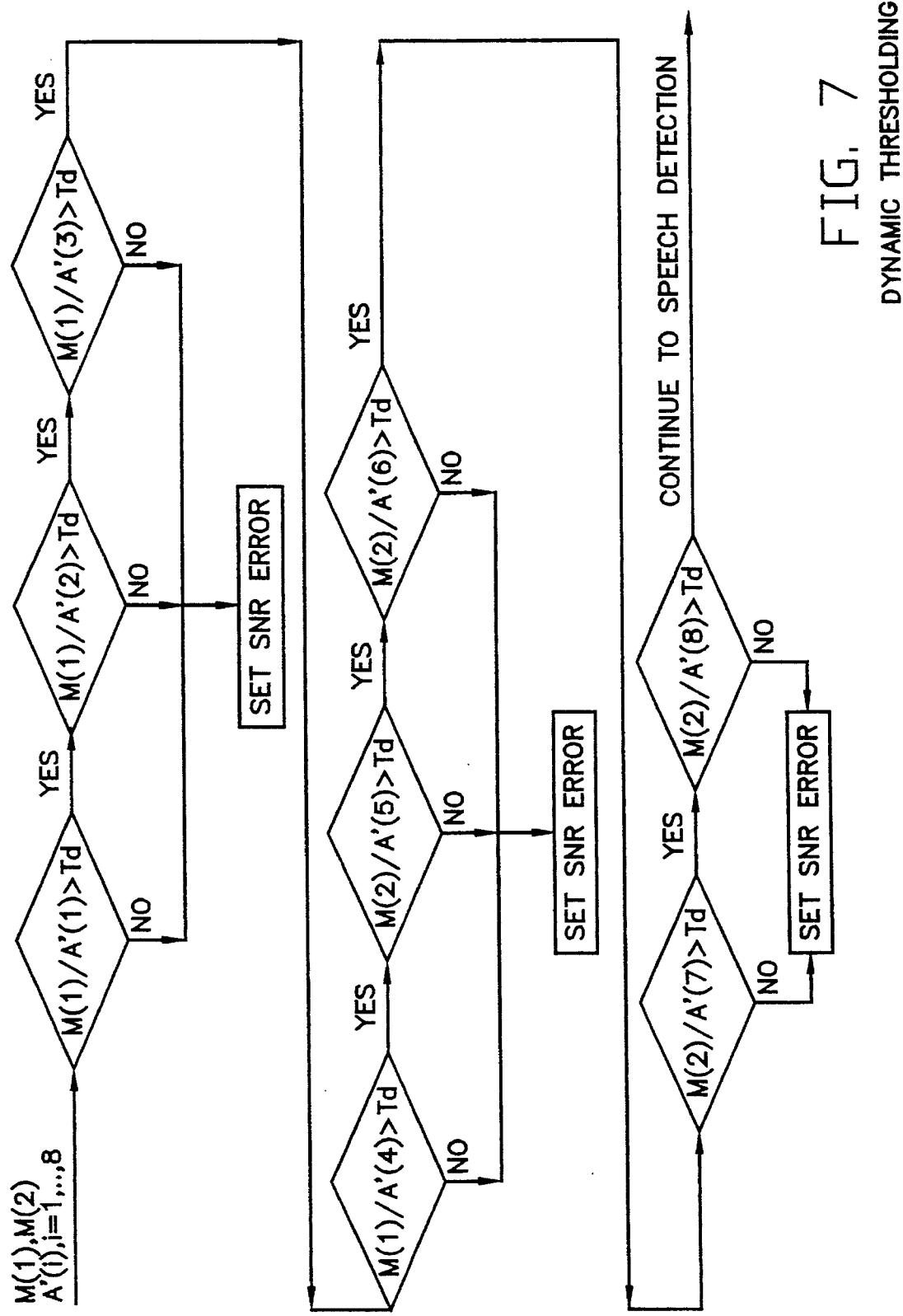
FIG. 7 illustrates operation of the dynamic thresholding in the flowchart diagram of FIG. 2.

Referring now to FIG. 7, the dynamic thresholding step 132 is shown. As shown, the dynamic thresholding step computes signal to noise ratios using ratios of the maximum energy values M(1) and M(2) to the other energy values in each respective group.

As shown, the DSP 106 computes the ratio of the maximum value M(1) in the first sub-array to each of the other values in the first sub-array, referred to as A'[u], A'[v], and A'[w]. These other values in the sub-array comprise the values in the first sub-array other than the maximum or M(1) value. Thus the dynamic thresholding step computes the ratio of the maximum value M(1) in the first sub-array to the other three values in the sub-array, i.e., three of the values of A'[1], A'[2], A'[3] and A'[4], excluding the maximum of these values, which is referred to as M(1). These other three values are referred to as A'[u], A'[v], and A'[w] in FIG. 7.

The dynamic thresholding step compares the above computed ratios with a threshold value Td. The ratio of the maximum value in the first sub-array to each of the other values in the first sub-array essentially computes the signal to noise ratio (SNR) of the received signals. The dynamic thresholding ensures that the ratio of the maximum value M(1) in the first sub-array to each of the other values in the first sub-array, i.e., the signal to noise ratio, is greater than the threshold value Td. If the ratio of the maximum value M(1) in the first sub-array to any of the other values in the first sub-array is not greater than the threshold value Td, the DSP 106 sets a signal/noise ratio error, and thus no detection is indicated.

Likewise, the DSP 106 in step 132 computes the ratio of the maximum value M(2) in the second sub-array to each of the other values in the second sub-array, referred to as A'[x], A'[y], and A'[z]. These other values in the sub-array comprise the values in the second sub-array other than the maximum or M(2) value. Thus the dynamic thresholding step computes the ratio of the maximum value M(2) in the second sub-array to the other three values in the sub-array, i.e., three of the values of A'[5], A'[6], A'[7] and A'[8], excluding the maximum of these values, which is referred to as M(2). These other three values are referred to as A'[x], A'[y], and A'[z] in FIG. 7.

The dynamic thresholding step compares the above computed ratios with the threshold value Td. As noted above, the ratio of the maximum value in the second sub-array to each of the other values in the second sub-array essentially computes the signal to noise ratio (SNR) of the received signals. The dynamic thresholding ensures that the ratio of the maximum value M(2) in the second sub-array to each of the other values in the second sub-array, i.e., the signal to noise ratio, is greater than the threshold value Td. If the ratio of the maximum value M(2) in the second sub-array to any of the other values in the second sub-array is not greater than the threshold value Td, the DSP 106 sets a signal/noise ratio error, and thus no detection is indicated.

Thus, in FIG. 7 the DSP 106 compares the ratio of the maximum value M(1) to each of the other values in the sub-array with a value Td and sets a SNR error if any of the ratios is less than Td. Likewise, the DSP 106 compares the ratio of the maximum value M(2) to each of the other values in the sub-array with the value Td and sets the SNR error if any of the ratios is less than Td. Because Td=10 $^{(required\ SNR\ in\ dB/20)}$, setting the SNR error means that either or both the column and row frequency values do not meet the required SNR. If the SNR error is set, no detection is indicated. In one embodiment where the standard requires a SNR of 12 dB, the dynamic threshold Td is preferably set to ensure that M(1) is at least four times as big as other values in the respective first sub-array, and that M(2) is at least four times as big as other values in the respective second sub-array.

Thus the frequency domain values (A'[1, . . . , 16]) obtained through the Goertzel algorithm and gain adjustment are compared against thresholds using both static and dynamic techniques. In the preferred embodiment, the static threshold is set to 6 (which provides a theoretical functional dynamic range of over 50 dB) and the dynamic threshold is set to 4 (about 12 dB). This allows very small DTMF signals (wide dynamic range) to be detected, as long as the signals have an acceptable signal to noise ratio. This also effectively eliminates most idle channel noise, speech, and white noise.

As described above, the ratio of the maximum value in a sub-array to each of the other values in the sub-array essentially computes the signal to noise ratio (SNR) of the received signals. The dynamic thresholding ensures that the ratio of the maximum value M(1) in the first sub-array to each of the other values in the first sub-array is greater than a threshold value. Likewise, the dynamic thresholding ensures that the ratio of the maximum value M(2) in the second sub-array to each of the other values in the second sub-array is greater than a threshold value. If either of the ratios is not greater than the threshold value, then a SNR error is set. Setting the SNR error means that either or both the column and row frequency values do not meet the required SNR. If the SNR error is set, no detection is indicated.

Step 134—Second Harmonic Thresholding

In step 134, the DSP 106 performs second harmonic thresholding to further examine the validity of the detected tones and eliminate speech triggered DTMF detection. This occurs before DTMF detection and usually is a continuous task for the DSP 106, even after the channel has been established. The human voice, especially the female voice, can have a large amount of energy components over 1000 Hz and can be mistaken as DTMF signal. Some music can also trigger DTMF detection. Thus speech detection and/or speech immunity is a very important criteria for evaluating the quality of a DTMF detector.

As discussed above, a real DTMF signal is the sum of two sinusoids and has two steep peaks in the frequency domain. Thus, a real DTMF signal does not have significant energy at second or higher harmonics. Speech on the other hand generally always has a significant amount of energy at the second and higher harmonics. This characteristic of speech make it easier to distinguish speech from DTMF signal. Thus the DTMF detector 102 examines the second harmonics of the fundamental DTMF frequency.

Prior art methods have conventionally examined the value of the second harmonics, A'[9, . . . , 16]. According to the present invention, the DSP 106 compares the second harmonics with the values at the fundamental harmonics, A'[1, ... ,8]. The DSP 106 computes the ratio of M[1]/M[3] and M[2]/M[4], and compares the results with a pre-set threshold.

It is noted that the ratio A'[i] / A'[i+8] (assuming A'[i] is the biggest value in its group) is not used because, if the speech has some energy at a frequency x% away from the bin, its second harmonic will have a distance of 2x% from the second harmonic bin. Therefore, the DSP 106 uses the maximum value in the second harmonic group to provide an estimate of the energy at the second harmonics. This is beneficial to talk-off performance of the DTMF detector.

Figure 8:
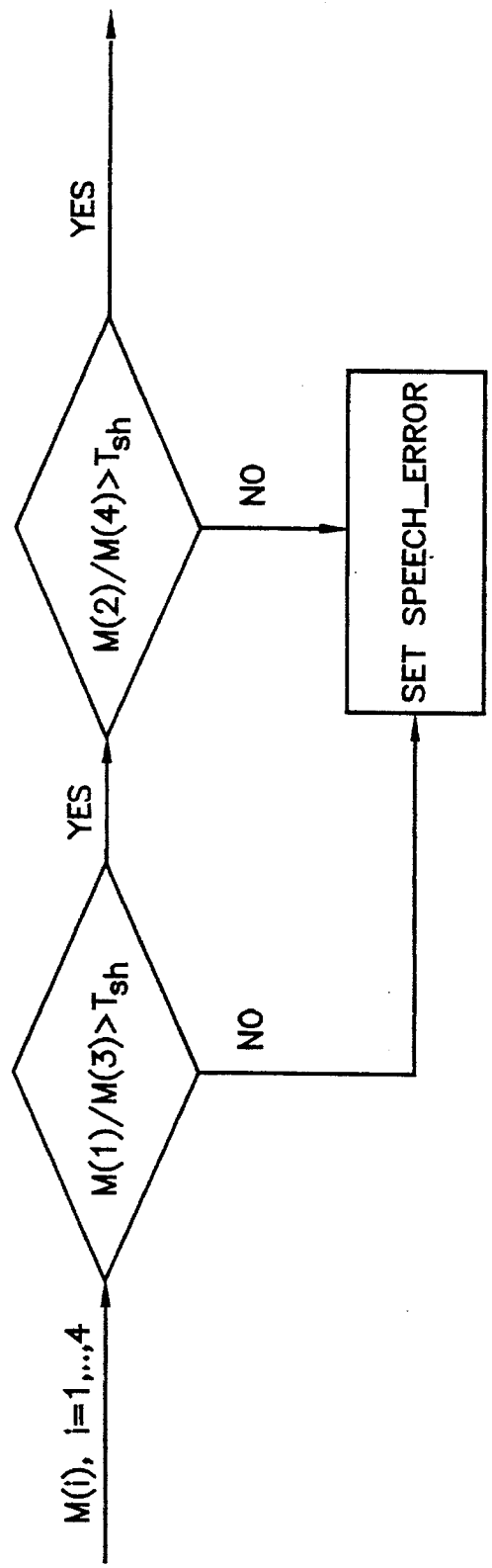
FIG. 8 illustrates operation of the second harmonic energy threshold check in the flowchart of FIG. 2.

Referring now to FIG. 8, a flowchart diagram illustrating operation of the second harmonic thresholding performed in step 134 of FIG. 2 is shown. As shown, in FIG. 8 the DSP 106 compares the ratio of the maximum values of the first and second harmonics, M1/M3, with the threshold value Tsh, and also compares the ratio of the maximum values of the first and second harmonics of the column frequency, i.e., the ratio M2/M4, and determines if this value is greater than the threshold Tsh. If either of the ratios M1/M3 or M2/M4 are not greater than the threshold Tsh, then a speech error signal is generated indicating that the detected signal actually corresponds to speech and not to a DTMF signal.

Step 136—Guard Time Check

The present invention discloses an improved guard time check method which overcomes the difficulty of meeting the guard-time performance requirement when using frame based processing methods (such as the Goertzel algorithm). The present invention also uses a larger cut-off duration value (but less than T1) as described below. A larger cut-off duration value provides better talk-off performance for the DTMF detector. This is because speech triggered 'fake DTMF signals' tend to have a short duration, while also having a frequency domain energy presentation which appears like a DTMF signal.

The guard-time parameter requires that all DTMF signals having a duration longer than T1 be detected as valid DTMF tones, i.e., no misses are allowed), whereas all DTMF signals shorter than T2 (T2<T1) can not be detected as valid DTMF signals. All tones have a duration between T1 and T2 are 'don't care' which means the detector has the flexibility to either detect or miss the signal. In general, it is deemed desirable to have a fixed cut-off value to warrant the guard-time performance.

The AT&T standard, and most other standards, require that any DTMF sequence longer than 40 ms must be accepted if it meets all other criteria. A DTMF sequence shorter than 20 ms should never be detected. Since the DTMF detector 102 of the preferred embodiment processes the speech sample as blocks, the DTMF detector 102 compares the maximum values(M[1] and M[2]) with the values from the previous and next frame to determine if the DTMF signal lasts at least 40 ms.

Figure 9:
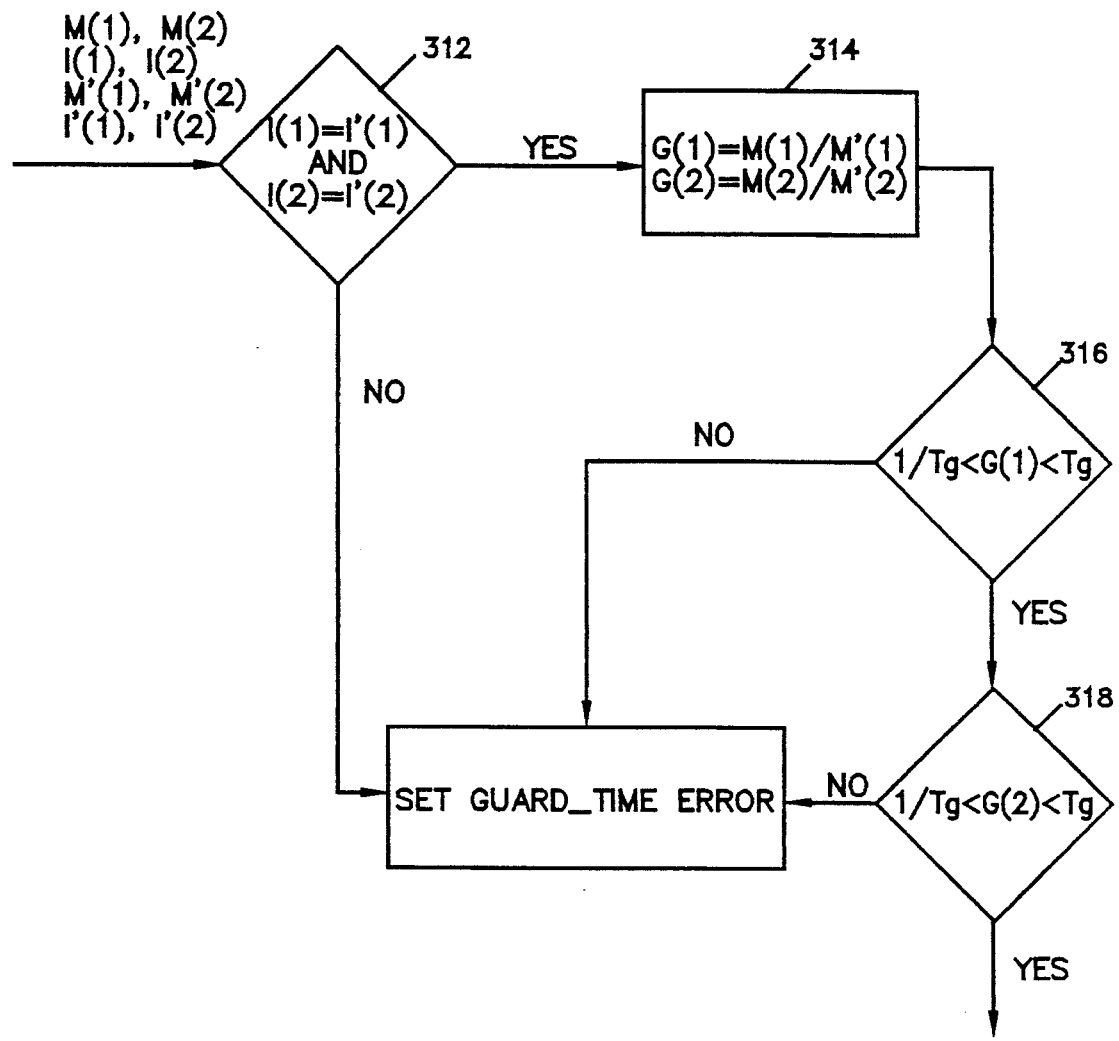
FIG. 9 illustrates operation of guard time checking functions performed by in the flowchart of FIG. 2.

Referring now to FIG. 9, a flowchart diagram illustrating the guard time check operation performed in step 136 of FIG. 1 is shown. As shown, in step 312 the DSP 106 determines if the index values I[1] and I'[1] are equal and index values I[2] and I'[2]are equal. Thus, this step determines if the DTMF signal has lasted a certain period of time. More specifically, this step determines if the indices of maximum values in consecutive frames are identical. If so, then in step 314 the DSP 106 computes the ratio or gain of the maximum value from the current and prior frame for each of the row and column frequencies. In other words, in step 314 the DSP 106 computes:

$G(1)=M(1)/M'(1);$ $G(2)=M(2)/M'(2);$

In steps 316 and 318 the DSP 106 determines if the computed ratios G1 and G2 are within a range>1/TG and <TG.

If the DSP 106 detects a DTMF signal which meets all of the criteria described above in steps 130–134, then the DSP 106 compares the maximum values with the values at the previous frame only if the indices remain the same. If the ratio, i.e., the result of the division, of the maximum values from the current and prior frame is greater than the value Tg, then the signal passes the guard-time check. It is noted that the value Tg is a programmable value that can be changed to meet different guard-time requirements. The value Tg is preferably 2.5. Thus in step 136 of FIG. 2 the DTMF detector 102 determines if the detected signal is of sufficient length to actually be a DTMF signal.

If the guard time check fails, the DSP 106 waits for the computation of next frame and compares the maximum value of current frame with the maximum value in the next frame, also assuming that the row and column indices remain the same. If the result is greater than Tg, the signal still passes the guard-time check. If this comparison fails again, then the signal on the current frame fails the guard-time check and cannot be recognized as a valid DTMF signal.

Step 138—Twist Computation and Thresholding

If the signal passes all of the above steps, then the final stage of evaluation is the twist check. Like the other parameters described above, twist is another important criteria to eliminate unqualified signals. The twist of a DTMF signal is defined as the level difference in dB between the higher and the lower tone.

$$\text{Twist} = 20\log_{10}\frac{M(2)}{M(1)}$$

Thus, if the twist is positive, the higher frequency level tone (the column frequency) is greater than the lower frequency level tone (the row frequency). In this instance, the twist is called forward twist. If the twist is negative, i.e., if the higher frequency level tone (the column frequency) is less than the lower frequency level tone (the row frequency), then the twist is called backward twist. A telecom standard typically defines a twist allowance between a forward twist threshold and a backward twist threshold. For example, AT&T requires:

−8 dB<twist<+4 dB

When a DTMF signal travels through a telephone channel, distortion and noise are added to the DTMF signal and cause phase delay, group delay and even severe amplitude distortion. These factors complicate the twist computation. According to the preferred embodiment, the DTMF detector 102 performs a twist computation only when the signal becomes stable. The DSP 106 monitors the outputs M[1] and M[2], which are the gain adjusted outputs from step 128, and only updates the twist value when both the higher and lower tone level in the current frame is greater then the previous frame, assuming that the row and column indexes, I[1] and I[2], remain the same. This method is illustrated in FIG. 10 and is executed as the following pseudo-code:

```
IF I[1] = I'[1] AND I[2] = I'[2] THEN
    IF M[1]>M'[1] AND M[2]>M'[2] THEN
        Twist = 20 log10 (M[2]/M[1])
    ELSE
        Twist = Twist'
    ENDIF
ENDIF
```

In practical implementation, only a linear twist value is computed to avoid logarithmic computation, and the linear twist value is then compared with linear twist thresholds to determine if the detection meets the twist requirement. Note: Twist' is the twist value for the previous frame I'[1] is I[1] in the previous frame, I'[2] is I[2] in the previous frame M'[1] is M[1] in the previous frame, and M'[2] is M[2] in the previous frame

DTMF Receiver Results Using MITEL 7292 Test Tape

The following tests were performed on the DTMF detector of the present invention using the Mitel 7292 test tape.

| Test 1: Frequency Distortion Allowance | | | | |
|---|---|---|---|---|
| Digit | 1 | 5 | 9 | D |
| Low Band Group | +2.5% | +2.8% | +2.4% | +2.2% |
|  | −2.7% | −2.3% | −2.4% | −2.0% |
| High Band Group | +2.5% | +2.0% | +2.1% | +2.0% |
|  | −2.8% | −2.8% | −2.3% | −2.0% |

| Test 2: Twist Test | | | | |
|---|---|---|---|---|
| Digit | 1 | 5 | 9 | D |
| Forward Twist | +3.7 dB | +3.7 dB | +3.5 | +3.7 dB |
| Backward Twist | −8.0 dB | −7.5 dB | −7.5 | −8.0 dB |

| Test 3: | Dynamic Range Test | | |
|---|---|---|---|
|  | 34 dB (Maximum Input Signal dynamic range) | | |
| Test 4: | Guard-time Test: 28.9 ms. | | |
| Test 5: | Signal to Noise Ratio Test | | |
| Input SNR | 24 dB | 18 dB | 12 dB |
| Detection | 1000/1000 | 1000/1000 | 1000/1000 |

| Test 6: | Talk-off Test: |
|---|---|
|  | 6 hits (one real DTMF signal and five false detections). |

System Requirements:

| Processing power: | <1.2 MIPS. |
|---|---|
| ROM usage: | 314 words. |
| RAM usage: | 69 words. |

Conclusion

Therefore, the present invention comprises a system and method for performing DTMF detection with improved speed and accuracy. The present invention performs both static and dynamic thresholding to achieve a larger dynamic range, improved speech immunity and better SNR control. The DTMF detector 102 of the present invention only has about 6 hits running the Mitel CM7291 standard test tape, whereas an algorithm which registers less than 10 hits is considered very good. The present invention also provides excellent performance in meeting other parameter criterias.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method for detecting dual tone multifrequency (DTMF) signals which uses static and dynamic thresholding, comprising:

receiving a plurality of digital samples of a received signal, wherein said received signal includes a plurality of tones, wherein said plurality of tones comprise two or more tones from a plurality of different uncorrelated frequencies, wherein said plurality of different uncorrelated frequencies comprise two or more frequency groups;

determining energy values for each of said different uncorrelated frequencies comprising said two or more frequency groups;

determining a maximum energy value among said different uncorrelated frequencies for each of said two or more frequency groups;

comparing each of said maximum energy values for each of said two or more frequency groups with a first fixed value;

determining if each of said maximum energy values for each of said two or more frequency groups is greater than said first fixed value;

calculating a plurality of ratios of said maximum energy values with other energy values of said different uncorrelated frequencies from respective ones of said two or more frequency groups;

comparing each of said plurality of ratios with a second fixed value; and determining if said calculated ratios are greater than said second fixed value.

2. The method of claim 1, further comprising:

detecting said plurality of tones in said received signal only if said determining determines that each of said maximum energy values for each of said two or more frequency groups is greater than said first fixed value and said determining determines that said calculated ratios are greater than said second fixed value.

3. The method of claim 1, further comprising:

setting a no detection flag if said determining determines that one or more of said maximum energy values is not greater than said first fixed value.

4. The method of claim 1, further comprising:

setting a no detection flag if said determining determines that one or more of said calculated ratios are not greater than said second fixed value.

5. The method of claim 1, wherein said plurality of ratios of said maximum energy values with other energy values of said different uncorrelated frequencies comprise signal to noise ratio estimates of said received signal.

6. The method of claim 1, wherein said calculating a plurality of ratios comprises, for each of said two or more frequency groups, calculating a plurality of ratios of said maximum energy value from a respective frequency group with other energy values of said different uncorrelated frequencies from said respective frequency group.

7. The method of claim 1, wherein said first threshold value comprises 6.

8. The method of claim 1, wherein said second threshold value comprises 4.

9. A dual tone multifrequency detector for detecting dual tone multifrequency (DTMF) signals, comprising:

means for receiving a plurality of digital samples of a received signal, wherein said received signal includes a plurality of tones, wherein said plurality of tones comprise two or more tones from a plurality of different uncorrelated frequencies, wherein said plurality of different uncorrelated frequencies comprise two or more frequency groups;

a digital signal processor for calculating a frequency spectrum on said plurality of digital samples for each of said plurality of different uncorrelated frequencies, wherein said digital signal processor determines energy values for each of said different uncorrelated frequencies comprising said two or more frequency groups;

wherein said digital signal processor determines a maximum energy value among said different uncorrelated frequencies for each of said two or more frequency groups and compares each of said maximum energy values for each of said two or more frequency groups with a first fixed value, wherein said digital signal processor determines if each of said maximum energy values for each of said two or more frequency groups is greater than said first fixed value;

wherein said digital signal processor calculates a plurality of ratios of said maximum energy values with other energy values of said different uncorrelated frequencies from respective ones of said two or more frequency groups, wherein said digital signal processor compares each of said plurality of ratios with a second fixed value and determines if said calculated ratios are greater than said second fixed value.

10. The dual tone multifrequency detector of claim 9, wherein said digital signal processor detects said plurality of tones in said received signal only if each of said maximum energy values for each of said two or more frequency groups is greater than said first fixed value and that said calculated ratios are greater than said second fixed value.

11. The dual tone multifrequency detector of claim 9, wherein said digital signal processor sets a no detection flag if one or more of said maximum energy values is not greater than said first fixed value.

12. The dual tone multifrequency detector of claim 9, wherein said digital signal processor sets a no detection flag if one or more of said calculated ratios are not greater than said second fixed value.

13. The dual tone multifrequency detector of claim 9, wherein said plurality of ratios of said maximum energy values with other energy values of said different uncorrelated frequencies comprise signal to noise ratio estimates of said received signal.

14. The dual tone multifrequency detector of claim 9, wherein, for each of said two or more frequency groups, said digital signal processor calculates a plurality of ratios of said maximum energy value from a respective frequency group with other energy values of said different uncorrelated frequencies from said respective frequency group.

15. The dual tone multifrequency detector of claim 9, wherein said first threshold value comprises 6.

16. The dual tone multifrequency detector of claim 9, wherein said second threshold value comprises 4.

17. A method for detecting multi tone multifrequency (MTMF) signals, comprising:

receiving a plurality of digital samples of a received signal, wherein said received signal includes a plurality of tones, wherein said plurality of tones comprise two or more tones from a plurality of different uncorrelated frequencies, wherein said plurality of different uncorrelated frequencies comprise one or more frequency groups;

calculating a frequency spectrum on said plurality of digital samples for each of said plurality of different uncorrelated frequencies, wherein said calculating produces an energy value for each of said different uncorrelated frequencies;

determining one or more maximum energy values of said energy values for each of said one or more frequency groups to detect said plurality of tones in said received signal;

comparing each of said one or more maximum energy values for each of said one or more frequency groups with a first fixed value;

determining if each of said one or more maximum energy values for each of said one or more frequency groups is greater than said first fixed value;

calculating a plurality of ratios of said one or more maximum energy values with other energy values of said different uncorrelated frequencies from each of said one or more frequency groups;

comparing each of said plurality of ratios with a second fixed value; and determining if said calculated ratios are greater than said second fixed value.

18. The method of claim 17, further comprising:

detecting said plurality of tones in said received signal only if said determining determines that each of said one or more maximum energy values for each of said one or more frequency groups is greater than said first fixed value and said determining determines that said calculated ratios are greater than said second fixed value.

19. The method of claim 17, further comprising:

setting a no detection flag if said determining determines that one or more of said maximum energy values is not greater than said first fixed value.

20. The method of claim 17, further comprising:

setting a no detection flag if said determining determines that one or more of said calculated ratios are not greater than said second fixed value.

21. The method of claim 17, wherein said plurality of ratios of said maximum energy values with other energy values of said different uncorrelated frequencies comprise signal to noise ratio estimates of said received signal.

22. The method of claim 17, wherein said calculating a plurality of ratios comprises, for each of said one or more frequency groups, calculating a plurality of ratios of said one or more maximum energy values from a respective frequency group with other energy values of said different uncorrelated frequencies from said respective frequency group.

23. A multi tone multifrequency detector for detecting multi tone multifrequency (MTMF) signals, comprising:

means for receiving a plurality of digital samples of a received signal, wherein said received signal includes a plurality of tones, wherein said plurality of tones comprise two or more tones from a plurality of different uncorrelated frequencies, wherein said plurality of different uncorrelated frequencies comprise one or more frequency groups;

a digital signal processor for calculating a frequency spectrum on said plurality of digital samples for each of said plurality of different uncorrelated frequencies, wherein said digital signal processor determines energy values for each of said different uncorrelated frequencies comprising said one or more frequency groups;

wherein said digital signal processor determines one or more maximum energy values among said different uncorrelated frequencies for each of said one or more frequency groups and compares each of said one or more maximum energy values with a first fixed value, wherein said digital signal processor determines if each of said one or more maximum energy values for each of said one or more frequency groups is greater than said first fixed value;

wherein said digital signal processor calculates a plurality of ratios of said one or more maximum energy values with other energy values of said different uncorrelated frequencies from respective ones of said one or more frequency groups, wherein said digital signal processor compares each of said plurality of ratios with a second fixed value and determines if said calculated ratios are greater than said second fixed value.

24. The multi tone multifrequency detector of claim 23, wherein said digital signal processor detects said plurality of tones in said received signal only if each of said one or more maximum energy values for each of said one or more frequency groups is greater than said first fixed value and that said calculated ratios are greater than said second fixed value.

25. The multi tone multifrequency detector of claim 23, wherein said digital signal processor sets a no detection flag if one or more of said maximum energy values is not greater than said first fixed value.

26. The multi tone multifrequency detector of claim 23, wherein said digital signal processor sets a no detection flag if one or more of said calculated ratios are not greater than said second fixed value.

27. The multi tone multifrequency detector of claim 23, wherein said plurality of ratios of said maximum energy values with other energy values of said different uncorrelated frequencies comprise signal to noise ratio estimates of said received signal.

28. The multi tone multifrequency detector of claim 23, wherein, for each of said one or more frequency groups, said digital signal processor calculates a plurality of ratios of said one or more maximum energy values from a respective frequency group with other energy values of said different uncorrelated frequencies from said respective frequency group.

* * * * *